(12) United States Patent
Hamano et al.

(10) Patent No.: US 11,658,347 B2
(45) Date of Patent: May 23, 2023

(54) LEAD-ACID BATTERY

(71) Applicant: GS Yuasa International Ltd., Kyoto (JP)

(72) Inventors: Yasuyuki Hamano, Kyoto (JP); Hiroki Kagohashi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 10 days.

(21) Appl. No.: 17/614,886

(22) PCT Filed: May 29, 2020

(86) PCT No.: PCT/JP2020/021479
§ 371 (c)(1),
(2) Date: Nov. 29, 2021

(87) PCT Pub. No.: WO2020/241882
PCT Pub. Date: Dec. 3, 2020

(65) Prior Publication Data
US 2022/0246994 A1 Aug. 4, 2022

(30) Foreign Application Priority Data
May 31, 2019 (JP) .............................. JP2019-103304

(51) Int. Cl.
*H01M 4/73* (2006.01)
*H01M 10/06* (2006.01)
(Continued)

(52) U.S. Cl.
CPC ............ *H01M 10/06* (2013.01); *H01M 4/662* (2013.01); *H01M 4/0478* (2013.01); *H01M 2004/027* (2013.01); *H01M 2004/028* (2013.01)

(58) Field of Classification Search
CPC ........ H01M 4/73; H01M 4/667; H01M 4/685; H01M 4/70; H01M 10/06; Y02E 60/10
See application file for complete search history.

(56) References Cited

U.S. PATENT DOCUMENTS

| 5,952,123 A | 9/1999 | Hatanaka et al. |
| 2003/0235763 A1* | 12/2003 | Gonzalez ................ H01M 4/73 |
| | | 427/126.3 |
| 2017/0194649 A1 | 7/2017 | Huusken |

FOREIGN PATENT DOCUMENTS

| JP | 51-47237 A2 | 4/1976 |
| JP | 60-30063 A2 | 2/1985 |

(Continued)

OTHER PUBLICATIONS

International Search Report (ISR) dated Aug. 4, 2020 filed in PCT/JP2020/021479.

*Primary Examiner* — Cynthia H Kelly
*Assistant Examiner* — Monique M Wills
(74) *Attorney, Agent, or Firm* — Rankin, Hill & Clark LLP

(57) ABSTRACT

A lead-acid battery includes a positive electrode plate, a negative electrode plate, and an electrolyte solution, in which the positive electrode plate includes a positive current collector and a positive electrode material, the negative electrode plate includes a negative current collector and a negative electrode material, the positive current collector contains Sn in an amount of 0.95% by mass or more, the negative electrode material contains a polymer compound, and the polymer compound has a peak in a range of 3.2 ppm or more and 3.8 ppm or less in a chemical shift of $^1$H-NMR spectrum, or the polymer compound contains a repeating structure of oxy $C_{2-4}$ alkylene units.

10 Claims, 2 Drawing Sheets

(51) Int. Cl.
*H01M 4/66* (2006.01)
*H01M 4/04* (2006.01)
*H01M 4/02* (2006.01)

(56) References Cited

FOREIGN PATENT DOCUMENTS

| | | |
|---|---|---|
| JP | 60-182662 A2 | 9/1985 |
| JP | 9-73895 A | 3/1997 |
| JP | 9-147872 A | 6/1997 |
| JP | 10-241673 A | 9/1998 |
| JP | 2000-149980 A | 5/2000 |
| JP | 2000-149981 A | 5/2000 |
| JP | 2003-346887 A | 12/2003 |
| JP | 2004-71477 A | 3/2004 |
| JP | 2017-525092 A | 8/2017 |

* cited by examiner

LEAD-ACID BATTERY

TECHNICAL FIELD

The present invention relates to a lead-acid battery.

BACKGROUND ART

Lead-acid batteries are used for various applications, including automotive and industrial applications. The lead-acid batteries include a negative electrode plate, a positive electrode plate, a separator (or mat), an electrolyte solution, and the like. An additive may be added to constituent members of the lead-acid battery from the viewpoint of imparting various functions.

Patent Document 1 proposes a lead-acid battery in which a copolymer of propylene oxide and ethylene oxide was added to a negative electrode plate active material in combination with lignin sulfonate.

Patent Document 2 proposes a lead-acid battery in which an activator containing an organic polymer is enclosed in a small sealed case having a cleavage mechanism into a container, and the small sealed case is attached to the container or a lid part.

Patent Document 3 proposes a fiber-attached mat containing a plurality of fibers coated with a size composition, a binder composition, and one or more additives, in which the additives include one or more of rubber additives, rubber derivatives, aldehydes, metal salts, ethylene-propylene oxide block copolymers, sulfuric acid esters, sulfonic acid esters, phosphoric acid esters, polyacrylic acid, polyvinyl alcohol, lignin, phenol formaldehyde resins, cellulose, wood flour, and the like, and the additives can function to reduce moisture loss in a lead-acid battery.

On the other hand, Patent Document 4 proposes that an expanded grid of a positive electrode plate of a valve regulated lead-acid battery is composed of a Pb—Ca—Sn alloy containing Sn in an amount of 1.2% by mass to 1.8% by mass. However, in such an expanded grid, since a slit portion is mechanically pulled to develop and stretch, it is necessary to pay attention to tensile strength and an elongation percentage of a rolled lead alloy sheet. In particular, when an Sn concentration in the rolled lead alloy sheet is increased to 1.2% by mass or more for the purpose of improving the trickle life of the lead-acid battery, while the tensile strength of the rolled lead alloy sheet is improved, the elongation percentage is reduced, and when a slit formation portion is developed to form a mesh portion, the mesh portion is cut, or cracks are generated.

PRIOR ART DOCUMENTS

Patent Documents

Patent Document 1: JP-A-60-182662
Patent Document 2: JP-A-2000-149980
Patent Document 3: JP-W-2017-525092
Patent Document 4: JP-A-2003-346887

SUMMARY OF THE INVENTION

Problems to be Solved by the Invention

A positive current collector containing Sn increases an overvoltage during charge of the lead-acid battery as compared to, for example, a positive current collector containing a Pb—Sb alloy, and therefore, a decomposition reaction of water contained in the electrolyte solution is suppressed. On the other hand, during float charging in a high-temperature environment, it is difficult to sufficiently suppress the decomposition reaction of water even in the case of using the positive current collector containing Sn, an amount of charge increases, and a corrosion reaction of the positive current collector proceeds. If the proceeding of the corrosion reaction continues, the positive current collector may be broken, and it may be difficult to perform charge and discharge.

Means for Solving the Problems

One aspect of the present invention relates to a lead-acid battery including a positive electrode plate, a negative electrode plate, an electrolyte solution, and a polymer compound, in which the positive electrode plate includes a positive current collector and a positive electrode material, the negative electrode plate includes a negative current collector and a negative electrode material, the positive current collector contains Sn in an amount of 0.95% by mass or more, and the polymer compound has a peak in a range of 3.2 ppm or more and 3.8 ppm or less in a chemical shift of $^1$H-NMR spectrum.

Another aspect of the present invention relates to a lead-acid battery including a positive electrode plate, a negative electrode plate, an electrolyte solution, and a polymer compound, in which the positive electrode plate includes a positive current collector and a positive electrode material, the negative electrode plate includes a negative current collector and a negative electrode material, the positive current collector contains Sn in an amount of 0.95% by mass or more, and the polymer compound contains a repeating structure of oxy $C_{2-4}$ alkylene units.

Advantages of the Invention

In the lead-acid battery, a corrosion reaction of the positive current collector during float charging in a high-temperature environment is suppressed.

MODE FOR CARRYING OUT THE INVENTION

[Lead-Acid Battery]

Figure 1:
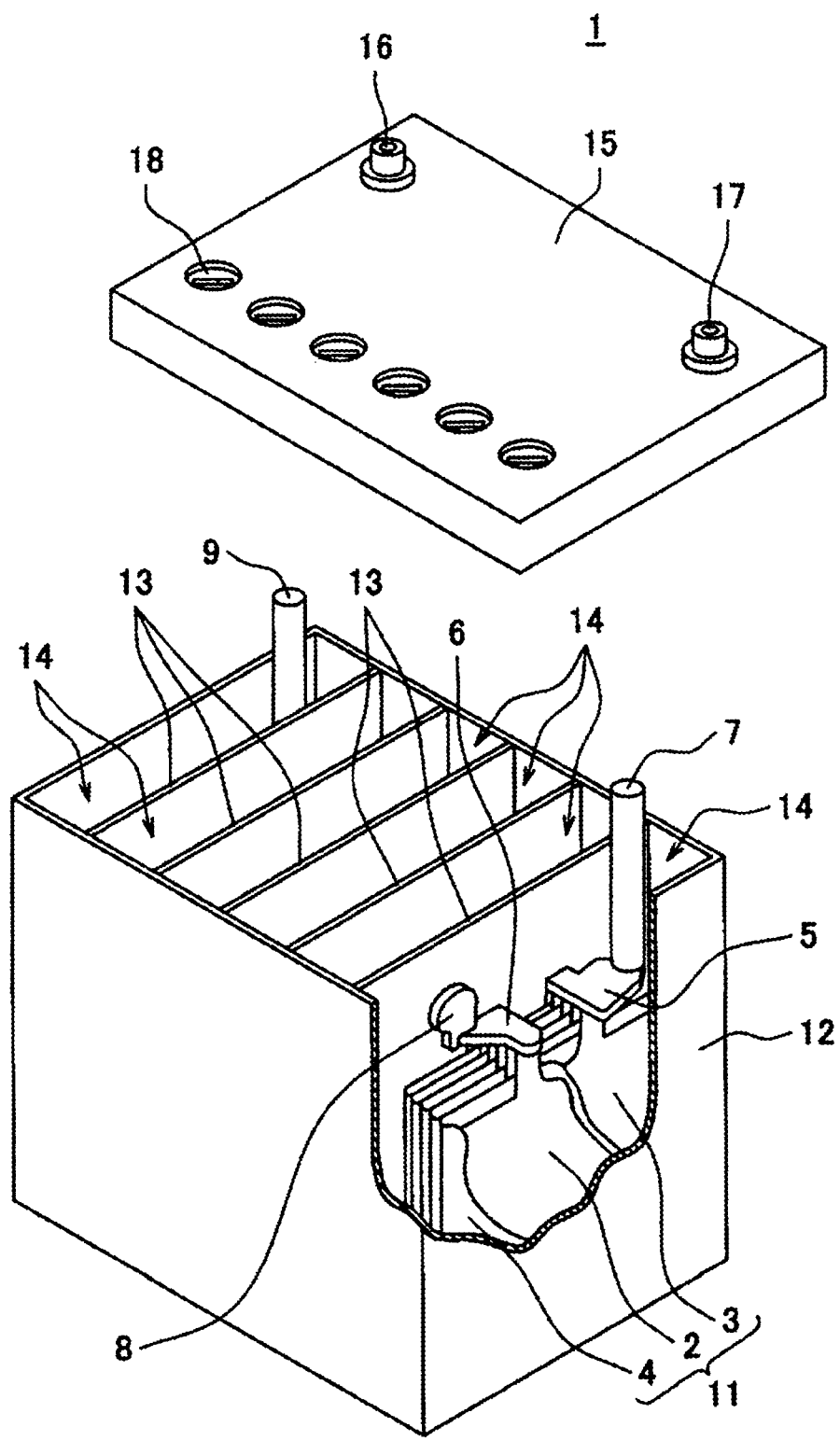
FIG. 1 is a partially cutaway exploded perspective view showing an appearance and an internal structure of a lead-acid battery according to one aspect of the present invention.

A lead-acid battery according to an embodiment of the present invention includes a positive electrode plate, a negative electrode plate, an electrolyte solution, and a polymer compound. The positive electrode plate includes a positive current collector and a positive electrode material. The negative electrode plate includes a negative current collector and a negative electrode material. The positive current collector contains Sn in an amount of 0.95% by mass or more.

The polymer compound has a peak in a range of 3.2 ppm or more and 3.8 ppm or less in a chemical shift of $^1$H-NMR spectrum. Alternatively, the polymer compound contains a repeating structure of oxy $C_{2-4}$ alkylene units. Note that the peak appearing in the range of 3.2 ppm or more and 3.8 ppm or less in the 1H-NMR spectrum is derived from an oxy $C_{2-4}$ alkylene unit. Hereinafter, these polymer compounds are simply collectively referred to as "polymer compounds". Here, the $^1$H-NMR spectrum is measured using deuterated chloroform as a solvent.

According to the above configuration, an effect of suppressing corrosion of the positive current collector during float charging in a high-temperature environment is remarkably enhanced, and durability of the lead-acid battery is remarkably improved. More specifically, when Sn is contained in the positive current collector, although the effect of suppressing corrosion of the positive current collector during float charging in a high-temperature environment is gradually improved as an Sn content increases, the improving effect tends to be gradually saturated. Here, in a case where the lead-acid battery contains a polymer compound, when the Sn content of the positive current collector is 0.95% by mass or more, the effect of suppressing corrosion of the positive current collector during float charging in a high-temperature environment is remarkably enhanced, and the durability of the lead-acid battery is remarkably improved. This is considered to be because the polymer compound acts on an Sn compound precipitated at a crystal grain boundary of the positive current collector in addition to the point that the polymer compound increases a negative electrode overvoltage to reduce a charge current value during float charging, which is advantageous for suppressing corrosion of the positive current collector.

Such remarkable improvement in durability is more specifically considered to be due to the following mechanism.

First, the polymer compound has an effect of increasing a hydrogen overvoltage in the negative electrode plate and suppressing a decomposition reaction of water during float charging. As a result, an amount of charge during float charging is reduced, which is advantageous for suppressing corrosion of the positive current collector. The reason why the durability is remarkably improved above a critical point where the Sn content of the positive current collector is 0.95% by mass is probably that the polymer compound adheres to the Sn compound precipitated at the crystal grain boundary of the positive current collector and fills a corroded portion of the grain boundary, thereby suppressing grain boundary corrosion. It is considered that when the Sn content of the positive current collector is 0.95% by mass or more, the amount of the Sn compound precipitated at the crystal grain boundary increases, and the effect of suppressing grain boundary corrosion by the polymer compound becomes remarkable.

However, since Sn is expensive, it is desired to reduce the Sn content of lead alloy constituting the positive current collector. When the Sn content of lead alloy increases, an elongation amount of lead alloy decreases, so that the workability and productivity of the positive current collector are deteriorated, and defects such as cracks are likely to occur. Therefore, there is a limit to increase the Sn content of lead alloy. The upper limit of the Sn content of the positive current collector capable of securing sufficient workability is, for example, less than 3.0% by mass, preferably 2.5% by mass or less, and from the viewpoint of securing higher workability, the Sn content is preferably 1.8% by mass or less. From the viewpoint of more remarkably suppressing corrosion of the positive current collector during float charging in a high-temperature environment, the Sn content of the positive current collector is preferably 1.1% by mass or more.

The positive current collector may further be composed of Pb—Ca—Sn alloy containing Ca. When the positive current collector contains Ca, the workability of lead alloy is improved, and the productivity of the positive current collector is improved. From the viewpoint of enhancing the effect of suppressing corrosion of the positive current collector, the Ca content of the positive current collector is preferably 0.17% by mass or less, more preferably 0.13 parts by mass or less, and may be 0.10 parts by mass or less, 0.07% by mass or less, or 0.05% by mass or less. From the viewpoint of sufficiently obtaining the effect of improving the productivity of the positive current collector by addition of Ca, the Ca content of the positive current collector may be, for example, 0.01% by mass or more, and may be 0.03% by mass or more.

Hereinafter, an action of the polymer compound on the negative electrode plate will be further described in detail. In a lead-acid battery, the decomposition reaction of water is greatly affected by a reductive reaction of hydrogen ions at an interface between lead and an electrolyte solution. A surface of lead in the negative electrode material is covered with the polymer compound, so that the hydrogen overvoltage increases, a side reaction in which hydrogen is generated from protons at the time of overcharge is inhibited, and the decomposition reaction of water is reduced. Thus, in order to enhance an effect of suppressing the amount of charge during float charging, the polymer compound is preferably contained at least in the negative electrode material.

However, the polymer compound easily takes a linear structure by having oxy $C_{2-4}$ alkylene units, and thus it is expected that the polymer compound hardly remains in the negative electrode material and easily diffuses into the electrolyte solution. However, in practice, even when the negative electrode material contains a very small amount of a polymer compound, an effect of reducing the amount of charge during float charging is obtained. When the polymer compound is contained in the negative electrode material and is present in the vicinity of lead, it is considered that the oxy $C_{2-4}$ alkylene unit exhibits a high adsorption action on lead.

The polymer compound contained in the negative electrode material exhibits the effect of reducing the amount of charge during float charging even in a very small amount. This suggests that the polymer compound spreads thinly on the lead surface and suppresses the reductive reaction of hydrogen ions in a wide region of the lead surface. This does not contradict that the polymer compound easily takes a linear structure. Since reduction of the amount of charge during float charging can reduce liquid decrease, it is advantageous for prolonging the life of the lead-acid battery.

In general, in a lead-acid battery, since a sulfuric acid aqueous solution is used as an electrolyte solution, when an organic additive (oil, polymer, organic expander, or the like) is contained in a negative electrode material, it becomes difficult to balance elution into the electrolyte solution and adsorption to lead. For example, when an organic additive having low adsorptivity to lead is used, elution into the electrolyte solution becomes easy, so that the amount of charge during float charging is hardly reduced. On the other hand, when an organic additive having high adsorptivity to lead is used, it is difficult to thinly adhere the organic additive to the lead surface, and the organic additive tends to be unevenly distributed in the lead pores.

In general, when the lead surface is covered with an organic additive, the reductive reaction of hydrogen ions hardly occurs, and therefore the amount of charge during float charging tends to decrease. On the other hand, when the lead surface is covered with the organic additive, lead sulfate generated during discharge is hardly eluted during charge, so that charge acceptability is deteriorated. Thus, suppression of deterioration of charge acceptability and reduction in the amount of charge during float charging are in a trade-off relationship, and it has been conventionally difficult to achieve both simultaneously. In addition, when the organic additive is unevenly distributed in lead pores, it is necessary to increase a content of the organic additive in the negative electrode material in order to ensure a sufficient effect of reducing the amount of charge during float charging. However, when the content of the organic additive is increased, the charge acceptability is greatly deteriorated.

When the organic additive is unevenly distributed in the lead pores, movement of ions (such as lead ions and sulfate ions) is inhibited by steric hindrance of the unevenly distributed organic additive. Thus, low-temperature high rate (HR) discharge performance is also deteriorated. When the content of the organic additive is increased in order to ensure a sufficient effect of reducing the amount of charge during float charging, movement of ions in the pores is further inhibited, and the low temperature HR discharge performance is also deteriorated.

On the other hand, for example, when the polymer compound having an oxy $C_{2-4}$ alkylene unit is contained in the negative electrode material, the lead surface is covered with the polymer compound in the thinly spread state as described above. Thus, as compared with the case of using other organic additives, even when the content in the negative electrode material is small, the effect of reducing the amount of charge during float charging can be sufficiently secured. Since the polymer compound thinly covers the lead surface, elution of lead sulfate, generated during discharge, during charge is less likely to be inhibited, and the deterioration of the charge acceptability can also be suppressed. Thus, it is possible to suppress the deterioration of the charge acceptability while reducing the amount of charge during float charging. Since the uneven distribution of the polymer compound in the lead pores is suppressed, ions easily move, and the deterioration of the low temperature HR discharge performance can also be suppressed.

In the lead-acid battery according to the present invention, the polymer compound may contain an oxygen atom bonded to a terminal group and a —CH2- group and/or a —CH< group bonded to the oxygen atom. In the $^1$H-NMR spectrum, a ratio of an integrated value of the peak of 3.2 ppm to 3.8 ppm to the sum of the integrated value of this peak, an integrated value of a peak of hydrogen atoms of the —CH$_2$< group bonded to the oxygen atom, and an integrated value of a peak of a hydrogen atom of the —CH< group bonded to the oxygen atom is preferably 85% or more. Such polymer compounds contain many oxy $C_{2-4}$ alkylene units in the molecule. Therefore, it is considered that it becomes easy to adsorb to lead, and it becomes easy to thinly cover the lead surface by easily taking a linear structure. Thus, the amount of charge during float charging can be more effectively reduced.

In the $^1$H-NMR spectrum, the polymer compound having a peak in the chemical shift range of 3.2 ppm to 3.8 ppm preferably contains a repeating structure of oxy $C_{2-4}$ alkylene units. When a polymer compound containing a repeating structure of oxy $C_{2-4}$ alkylene units is used, it is considered it becomes easier to adsorb to lead, and it becomes easy to thinly cover the lead surface by easily taking a linear structure.

In the present specification, the polymer compound refers to a compound having a repeating unit of oxy $C_{2-4}$ alkylene units and/or having a number average molecular weight (Mn) of 500 or more.

Note that the oxy $C_{2-4}$ alkylene unit is a unit represented by —O—R$^1$—(R$^1$ represents a $C_{2-4}$ alkylene group.).

The polymer compound may contain at least one selected from the group consisting of etherified products of a hydroxy compound having a repeating structure of oxy $C_{2-4}$ alkylene units and esterified products of a hydroxy compound having a repeating structure of oxy $C_{2-4}$ alkylene units. Here, the hydroxy compound is at least one selected from the group consisting of poly $C_{2-4}$ alkylene glycols, copolymers containing a repeating structure of oxy $C_{2-4}$ alkylene, and $C_{2-4}$ alkylene oxide adducts of a polyol. When such a polymer compound is used, the deterioration of the charge acceptability can be further suppressed. Since the effect of reducing the amount of charge of water during float charging is high, generation of hydrogen gas can be more effectively suppressed, and a high liquid decrease suppressing effect can be obtained.

The repeating structure of oxy $C_{2-4}$ alkylene units may contain at least a repeating structure of oxypropylene units (—O—CH(—CH$_3$)—CH$_2$—). Such a polymer compound easily spreads thinly on a lead surface while having high adsorptivity to lead, and is considered to have an excellent balance therebetween. Thus, the decomposition reaction of water during float charging is easily suppressed, and the amount of charge can be more effectively reduced.

As described above, since the polymer compound can thinly cover the lead surface while having high adsorptivity to lead, even if the content of the polymer compound in the negative electrode material is small (for example, 500 ppm or less), the amount of charge during float charging can be reduced. Since a sufficient effect of reducing the amount of charge during float charging can be secured even if the content is small, it is also possible to suppress the deterioration of the charge acceptability. Similarly, it is considered that the polymer compound slightly eluted from the negative electrode material has high adsorptivity also to the Sn compound precipitated at the crystal grain boundary of the positive current collector. From the viewpoint of sufficiently suppressing corrosion of the positive current collector even in a high-temperature environment, the content of the polymer compound in the negative electrode material is preferably 5 ppm or more.

The polymer compound is preferably contained in the negative electrode material, but may be contained in any of the components (for example, a negative electrode plate, a positive electrode plate, an electrolyte solution, and/or a separator, and the like) of the lead-acid battery when preparing the lead-acid battery. The polymer compound may be contained in one constituent element, or may be contained in two or more constituent elements (for example, a negative electrode plate, an electrolyte solution, and the like).

The content of the polymer compound in the negative electrode material and the concentration of the polymer compound in the electrolyte solution are determined for a lead-acid battery in a fully charged state.

In the present specification, the fully charged state of the flooded-type lead-acid battery is defined by the definition of JIS D 5301: 2006. More specifically, the following state is defined as a fully charged state: the lead-acid battery is charged at a current (A) 0.2 times as large as a numerical value described as a rated capacity (Ah) until a terminal voltage during charge measured every 15 minutes or an electrolyte solution density subjected to temperature correction to 20° C. exhibits a constant value at three significant digits continuously three times. The fully charged state of a valve regulated lead-acid battery is a state where the lead-acid battery after formation is subjected to constant current constant voltage charge of 2.23 V/cell at a current (A) 0.2 times as large as the numerical value described as the rated capacity (Ah) in an air tank of 25° C.±2° C., and the charge is completed when the charge current during constant voltage charge becomes 0.005 times as large as the numerical value described in the rated capacity. Note that the numerical value described as the rated capacity is a numerical value in which the unit is Ah. The unit of the current set based on the numerical value indicated as the rated capacity is A.

The lead-acid battery in the fully charged state refers to a battery obtained by fully charging a formed lead-acid battery. The full charge of the lead-acid battery may be performed immediately after formation so long as being performed after formation or may be performed after the lapse of time from formation (e.g., a lead-acid battery in use (preferably at the initial stage of use) after formation may be fully charged). The battery at the initial stage of use refers to a battery that has not been used for a long time and has hardly deteriorated.

In the present specification, the number average molecular weight Mn is determined by gel permeation chromatography (GPC). A standard substance used for determining Mn is polyethylene glycol.

The lead-acid battery may be either a valve regulated (sealed) lead-acid battery or a flooded-type (vented type) lead-acid battery.

Hereinafter, the lead-acid battery according to an embodiment of the present invention will be described for each of the main constituent elements, but the present invention is not limited to the following embodiment.

[Lead-Acid Battery]
(Negative Electrode Plate)

The negative electrode plate usually includes a negative current collector in addition to a negative electrode material. The negative electrode material is obtained by removing the negative current collector from the negative electrode plate. Note that a member such as a mat or a pasting paper may be stuck to the negative electrode plate. Such a member (sticking member) is used integrally with the negative electrode plate and is thus assumed to be included in the negative electrode plate. Also, when the negative electrode plate includes such a member, the negative electrode material excludes the negative current collector and the sticking member. However, when the sticking member such as a mat is attached to a separator, a thickness of the sticking member is included in a thickness of the separator.

The negative current collector may be formed by casting lead (Pb) or a lead alloy, or may be formed by processing a lead sheet or a lead alloy sheet. Examples of the processing method include expanding processing and punching processing. It is preferable to use a negative electrode grid as the negative current collector because the negative electrode material is easily supported.

The lead alloy used for the negative current collector may be any of a Pb—Sb-based alloy, a Pb—Ca-based alloy, and a Pb—Ca—Sn-based alloy. The lead or lead alloys may further contain, as an additive element, at least one selected from the group consisting of Ba, Ag, Al, Bi, As, Se, Cu, and the like. The negative current collector may include a surface layer. The surface layer and the inner layer of the negative current collector may have different compositions. The surface layer may be formed in the lug of the negative current collector. The surface layer of the lug may contain Sn or an Sn alloy.

The negative electrode plate can be formed in such a manner that a negative current collector is coated or filled with a negative electrode paste, which is then cured and dried to prepare a non-formed negative electrode plate, and thereafter, the non-formed negative electrode plate is formed. The negative electrode paste is prepared by adding water and sulfuric acid to lead powder and an organic expander, and various additives as necessary, and kneading the mixture. At the time of curing, it is preferable to cure the non-formed negative electrode plate at a higher temperature than room temperature and high humidity.

The negative electrode material contains the above polymer compound. The negative electrode material further contains a negative active material (lead or lead sulfate) that exhibits a capacity through a redox reaction. The negative electrode material may contain an expander, a carbonaceous material, and/or other additives. Examples of the additive include barium sulfate, fibers (resin fibers and the like), and the like, but are not limited thereto. Note that the negative active material in the charged state is spongy lead, but the non-formed negative electrode plate is usually prepared using lead powder.

(Polymer Compound)

The polymer compound has a peak in a range of 3.2 ppm or more and 3.8 ppm or less in a chemical shift of $^1$H-NMR spectrum. Such polymer compounds have oxy $C_{2-4}$ alkylene units. Examples of the oxy $C_{2-4}$ alkylene unit include an oxyethylene unit, an oxypropylene unit, an oxytrimethylene unit, an oxy 2-methyl-1,3-propylene unit, an oxy 1,4-butylene unit, an oxy 1,3-butylene unit, and the like. The polymer compound may have one kind or two or more kinds of such oxy $C_{2-4}$ alkylene units.

The polymer compound preferably contains a repeating structure of oxy $C_{2-4}$ alkylene units. The repeating structure may contain one kind of oxy $C_{2-4}$ alkylene unit, or may contain two or more kinds of oxy $C_{2-4}$ alkylene units. The polymer compound may contain one kind of the repeating structure or two or more kinds of repeating structures.

Examples of the polymer compound include hydroxy compounds having a repeating structure of oxy $C_{2-4}$ alkylene units (poly $C_{2-4}$ alkylene glycols, copolymers containing a repeating structure of oxy $C_{2-4}$ alkylene, $C_{2-4}$ alkylene oxide adducts of a polyol, and the like), etherified or esterified products of these hydroxy compounds, and the like.

Examples of the copolymer include copolymers containing different oxy $C_{2-4}$ alkylene units, poly $C_{2-4}$ alkylene glycol alkyl ethers, poly $C_{2-4}$ alkylene glycol esters of carboxylic acids, and the like. The copolymer may be a block copolymer.

The polyol may be any of an aliphatic polyol, an alicyclic polyol, an aromatic polyol, a heterocyclic polyol, and the like. From the viewpoint that the polymer compound easily spreads thinly on the lead surface, aliphatic polyols, alicyclic polyols (for example, polyhydroxycyclohexane, polyhydroxynorbornane, and the like), and the like are preferable, and among them, aliphatic polyols are preferable. Examples of the aliphatic polyol include aliphatic diols and polyols of triol or higher (for example, glycerin, trimethylolpropane, pentaerythritol, sugar alcohol, and the like), and the like. Examples of the aliphatic diol include an alkylene glycol having 5 or more carbon atoms. The alkylene glycol may be, for example, a $C_{5-14}$ alkylene glycol or a $C_{5-10}$ alkylene glycol. Examples of the sugar alcohol include erythritol, xylitol, mannitol, sorbitol, and the like. In the alkylene oxide adduct of the polyol, the alkylene oxide corresponds to an oxy $C_{2-4}$ alkylene unit of the polymer compound and contains at least $C_{2-4}$ alkylene oxide. From the viewpoint that the polymer compound easily take a linear structure, the polyol is preferably a diol.

The etherified product has an —OR² group obtained by etherifying —OH groups (—OH groups composed of a hydrogen atom of a terminal group and an oxygen atom bonded to the hydrogen atom) at at least a part of terminals of the hydroxy compound having the repeating structure of oxy $C_{2-4}$ alkylene units (wherein R² is an organic group.). Among terminals of the polymer compound, some terminals may be etherified, or all terminals may be etherified. For example, one terminal of a main chain of the linear polymer compound may be an —OH group, and the other terminal may be an —OR² group.

The esterified product has an —O—C(=O)—R³ group obtained by esterifying —OH groups (—OH groups composed of a hydrogen atom of a terminal group and an oxygen atom bonded to the hydrogen atom) at at least a part of terminals of the hydroxy compound having the repeating structure of oxy $C_{2-4}$ alkylene units (wherein R³ is an organic group.). Among terminals of the polymer compound, some terminals may be esterified, or all terminals may be esterified. For example, one terminal of a main chain of the linear polymer compound may be an —OH group, and the other terminal may be an —O—C(=O)—R³ group.

Examples of each of the organic groups R² and R³ include a hydrocarbon group. The hydrocarbon group may have a substituent (for example, a hydroxy group, an alkoxy group, and/or a carboxy group, and the like). The hydrocarbon group may be any of aliphatic, alicyclic, and aromatic. The aromatic hydrocarbon group and the alicyclic hydrocarbon group may have an aliphatic hydrocarbon group (for example, an alkyl group, an alkenyl group, an alkynyl group, or the like) as a substituent. The number of carbon atoms of the aliphatic hydrocarbon group as a substituent may be, for example, 1 to 20, 1 to 10, 1 to 6, or 1 to 4.

Examples of the aromatic hydrocarbon group include aromatic hydrocarbon groups having 24 or less carbon atoms (for example, 6 to 24). The number of carbon atoms of the aromatic hydrocarbon group may be 20 or less (for example, 6 to 20), 14 or less (for example, 6 to 14), or 12 or less (for example, 6 to 12). Examples of the aromatic hydrocarbon group include an aryl group, a bisaryl group, and the like. Examples of the aryl group include a phenyl group, a naphthyl group, and the like. Examples of the bisaryl group include monovalent groups corresponding to bisarene. Examples of the bisarene include biphenyl and bisarylalkanes (for example, bis $C_{6-10}$ aryl $C_{1-4}$ alkanes (such as 2,2-bisphenylpropane), and the like).

Examples of the alicyclic hydrocarbon group include alicyclic hydrocarbon groups having 16 or less carbon atoms. The alicyclic hydrocarbon group may be a bridged cyclic hydrocarbon group. The number of carbon atoms of the alicyclic hydrocarbon group may be 10 or less or 8 or less. The number of carbon atoms of the alicyclic hydrocarbon group is, for example, 5 or more, and may be 6 or more.

The number of carbon atoms of the alicyclic hydrocarbon group may be 5 (or 6) or more and 16 or less, 5 (or 6) or more and 10 or less, or 5 (or 6) or more and 8 or less.

Examples of the alicyclic hydrocarbon group include cycloalkyl groups (cyclopentyl group, cyclohexyl group, cyclooctyl group, and the like), cycloalkenyl groups (cyclohexenyl group, cyclooctenyl group, and the like), and the like. The alicyclic hydrocarbon group also includes hydrogenated products of the aromatic hydrocarbon groups.

Among the hydrocarbon groups, an aliphatic hydrocarbon group is preferable from the viewpoint that the polymer compound easily adheres thinly to the lead surface. Examples of the aliphatic hydrocarbon group include alkyl groups, alkenyl groups, alkynyl groups, dienyl groups, and the like. The aliphatic hydrocarbon group may be either linear or branched.

The number of carbon atoms of the aliphatic hydrocarbon group is, for example, 30 or less, and may be 26 or less or 22 or less, 20 or less or 16 or less, 14 or less or 10 or less, or 8 or less or 6 or less. Examples of the aliphatic hydrocarbon group include alkyl groups, alkenyl groups, alkynyl groups, dienyl groups, and the like. Among them, an alkyl group and an alkenyl group are preferable from the viewpoint that the polymer compound easily adheres thinly to the lead surface.

Specific examples of the alkyl group include methyl, ethyl, n-propyl, i-propyl, n-butyl, i-butyl, s-butyl, t-butyl, n-pentyl, neopentyl, i-pentyl, s-pentyl, 3-pentyl, t-pentyl, n-hexyl, 2-ethylhexyl, n-octyl, n-decyl, i-decyl, lauryl, myristyl, cetyl, stearyl, behenyl, and the like.

Specific examples of the alkenyl group include vinyl, 1-propenyl, allyl, palmitoleyl, oleyl, and the like. An alkenyl group may be, for example, a $C_{2-30}$ alkenyl group or a $C_{2-26}$ alkenyl group, a $C_{2-22}$ alkenyl group or a $C_{2-20}$ alkenyl group, or a $C_{10-20}$ alkenyl group.

When an etherified product of a hydroxy compound having a repeating structure of oxy $C_{2-4}$ alkylene units and/or an esterified product of a hydroxy compound having a repeating structure of oxy $C_{2-4}$ alkylene units are used among the polymer compounds, it is preferable because the effect of suppressing the deterioration of the charge acceptability can be further enhanced. Even when these polymer compounds are used, a high liquid decrease suppressing effect can be secured.

The negative electrode material may contain one kind or two or more kinds of polymer compounds.

From the viewpoint of further enhancing the effect of reducing the amount of charge during float charging, it is preferable that the repeating structure of oxy $C_{2-4}$ alkylene contains at least a repeating structure of oxypropylene units. The polymer compound containing the oxypropylene unit has peaks derived from —CH< and —CH₂— of the oxypropylene unit in a range of 3.2 ppm to 3.8 ppm in a chemical shift of ¹H-NMR spectrum.

Since electron densities around a nucleus of a hydrogen atom in these groups are different, the peak is split. Such a polymer compound has peaks, for example, in a range of 3.2 ppm or more and 3.42 ppm or less and a range of more than 3.42 ppm and 3.8 ppm or less in a chemical shift of ¹H-NMR spectrum. The peak in the range of 3.2 ppm or more and 3.42 ppm or less is derived from —CH₂—, and the peak in the range of more than 3.42 ppm and 3.8 ppm or less is derived from —CH< and —CH₂—.

Examples of such a polymer compound include polypropylene glycol, a copolymer containing a repeating structure of oxypropylene, a propylene oxide adduct of the polyol, etherified or esterified products thereof, and the like. Examples of the copolymer include oxypropylene-oxyalkylene copolymers (provided that the oxyalkylene is a $C_{2-4}$ alkylene other than oxypropylene), polypropylene glycol alkyl ethers, a polypropylene glycol ester of a carboxylic acid, and the like. Examples of the oxypropylene-oxyalkylene copolymer include an oxypropylene-oxyethylene copolymer, an oxypropylene-oxytrimethylene copolymer, and the like. The oxypropylene-oxyalkylene copolymer may be a block copolymer.

In the polymer compound containing a repeating structure of oxypropylene, the proportion of the oxypropylene unit is, for example, 5 mol % or more, and may be 10 mol % or more or 20 mol % or more.

It is preferable that the polymer compound contains a large amount of oxy $C_{2-4}$ alkylene units from the viewpoint of enhancing the adsorptivity to lead and the adsorptivity to the Sn compound precipitated at the crystal grain boundary of the positive current collector, and easily taking a linear structure. Such a polymer compound includes, for example, an oxygen atom bonded to a terminal group and a —$CH_2$— group and/or a —CH< group bonded to the oxygen atom. In the $^1$H-NMR spectrum of the polymer compound, the ratio of the integrated value of the peak of 3.2 ppm to 3.8 ppm to the sum of the integrated value of this peak, the integrated value of the peak of the hydrogen atoms of the —$CH_2$— group, and the integrated value of the peak of the hydrogen atom of the —CH< group increases. This ratio is, for example, 50% or more, and may be 80% or more. From the viewpoint of further enhancing the effect of reducing the amount of charge during float charging and further enhancing the effect of suppressing the deterioration of the charge acceptability and/or the low temperature HR discharge performance, the above ratio is preferably 85% or more, and more preferably 90% or more. For example, when the polymer compound has an —OH group at a terminal and also has a —$CH_2$— group or a —CH< group bonded to an oxygen atom of the —OH group, in the $^1$H-NMR spectrum, the peaks of the hydrogen atoms of the —$CH_2$— group and the —CH< group have a chemical shift in a range of more than 3.8 ppm and 4.0 ppm or less.

The polymer compound may contain a compound having Mn of 500 or more, a compound having Mn of 600 or more, or a compound having Mn of 1,000 or more. Mn of such a compound is, for example, 20000 or less, and may be 15000 or less or 10000 or less. The Mn of the compound is preferably 5000 or less and may be 4000 or less or 3500 or less, from the viewpoint of easily retaining the polymer compound in the negative electrode material, easily spreading the polymer compound thinner on the lead surface, and easily adhering to the Sn compound precipitated at the crystal grain boundary of the positive current collector.

The Mn of the compound may be 500 or more (or 600 or more) and 20,000 or less, 500 or more (or 600 or more) and 15000 or less, 500 or more (or 600 or more) and 10000 or less, 500 or more (or 600 or more) and 5000 or less, 500 or more (or 600 or more) and 4000 or less, 500 or more (or 600 or more) and 3500 or less, 1000 or more and 20000 or less (or 15000 or less), 1000 or more and 10000 or less (or 5000 or less), or 1000 or more and 4000 or less (or 3500 or less).

The polymer compound preferably contains at least a compound having Mn of 1,000 or more. Mn of such a compound may be 1,000 or more and 20,000 or less, 1,000 or more and 15,000 or less, or 1,000 or more and 10,000 or less. The Mn of the compound is preferably 1,000 or more and 5,000 or less, may be 1,000 or more and 4,000 or less, or may be 1,000 or more and 3,500 or less from the viewpoint of easily retaining the compound in the negative electrode material, easily spreading the polymer compound thinner on the lead surface, and easily adhering to the Sn compound precipitated at the crystal grain boundary of the positive current collector by suitably eluting the polymer compound from the negative electrode material. When a compound having such Mn is used, a corrosion reaction of the positive current collector during float charging in a high-temperature environment can be more remarkably suppressed. A structural change of the negative active material due to collision of the hydrogen gas with the negative active material can also be suppressed. Thus, the effect of suppressing the deterioration of the low temperature HR discharge performance after the high temperature light load test can be enhanced. Since the compound having Mn as described above easily moves into the negative electrode material even when the compound is contained in the electrolyte solution, the compound can be replenished into the negative electrode material, and from such a viewpoint, the compound is easily retained in the negative electrode material. As the polymer compound, two or more compounds having different Mn may be used. That is, the polymer compound may have a plurality of peaks of Mn in the distribution of the molecular weight.

The content of the polymer compound in the negative electrode material may be, for example, 5 ppm or more and may be 50 ppm or more or 250 ppm or more on a mass basis. When the content of the polymer compound is in such a range, a hydrogen generation voltage can be more easily increased, the effect of reducing the amount of charge during float charging can be further enhanced, and the polymer compound can be easily adhered to the Sn compound precipitated at the crystal grain boundary of the positive current collector. The content (mass basis) of the polymer compound in the negative electrode material is, for example, 500 ppm or less, and may be 360 ppm or less, or 350 ppm or less. When the content of the polymer compound is 500 ppm or less, the lead surface is suppressed from being excessively covered with the polymer compound, so that the deterioration of the low temperature HR discharge performance can be effectively suppressed. These lower limit values and upper limit values can be combined arbitrarily.

The content (mass basis) of the polymer compound in the negative electrode material may be 5 ppm or more and 500 ppm or less, 50 ppm or more and 500 ppm or less, 250 ppm or more and 500 ppm or less, 5 ppm or more and 250 ppm or less, or 50 ppm or more and 250 ppm or less.

(Expander)

The negative electrode material can contain an expander. As the expander, an organic expander is preferable. As the organic expander, lignins and/or a synthetic organic expander may be used. Examples of the lignins include lignin, lignin derivatives, and the like. Examples of the lignin derivative include lignin sulfonic acid or salts thereof (such as alkali metal salts (sodium salts and the like)), and the like. The organic expanders are generally roughly classified into lignins and synthetic organic expanders. It can also be said that the synthetic organic expander is an organic expander other than lignins. The synthetic organic expander is an organic polymer containing sulfur element, and generally contains a plurality of aromatic rings in the molecule and sulfur element as a sulfur-containing group. Among the sulfur-containing groups, a sulfonic acid group or a sulfonyl group which is in a stable form is preferable. The sulfonic acid group may exist in an acid form, or may exist in a salt form like a Na salt. The negative electrode material may contain one kind or two or more kinds of expanders.

As the organic expander, it is preferable to use a condensate containing at least a unit of an aromatic compound. Examples of such a condensate include a condensate of an aromatic compound with an aldehyde compound (aldehydes (for example, formaldehyde) and/or condensates thereof, and the like). The organic expander may contain a unit of one kind of an aromatic compound or a unit of two or more kinds of aromatic compounds.

Note that the unit of an aromatic compound refers to a unit derived from an aromatic compound incorporated in a condensate.

As the organic expander, one synthesized by a known method may be used, or a commercially available product may be used. The condensate containing a unit of an aromatic compound is obtained, for example, by reacting an aromatic compound with an aldehyde compound. For example, by performing this reaction in the presence of a sulfite or using an aromatic compound containing sulfur element (for example, bisphenol S or the like), an organic expander containing sulfur element can be obtained. For example, the sulfur element content in the organic expander can be adjusted by adjusting the amount of sulfite and/or the amount of the aromatic compound containing sulfur element. Also when other raw materials are used, the condensate containing a unit of an aromatic compound can be obtained according to this method.

Examples of the aromatic ring of the aromatic compound include a benzene ring, a naphthalene ring, and the like. When the aromatic compound has a plurality of aromatic rings, the plurality of aromatic rings may be linked by a direct bond, a linking group (for example, an alkylene group (including an alkylidene group), a sulfone group, and the like), or the like. Examples of such a structure include bisarene structures (biphenyl, bisphenylalkane, bisphenylsulfone, and the like). Examples of the aromatic compound include compounds having the aromatic ring and a hydroxy group and/or an amino group. The hydroxy group or the amino group may be directly bonded to the aromatic ring, or may be bonded as an alkyl chain having a hydroxy group or an amino group. Note that the hydroxy group also includes salts of hydroxy group (—OMe). The amino group also includes salts of amino group (salts with anion). Examples of Me include alkali metals (Li, K, Na, and the like), Group 2 metals of the periodic table (Ca, Mg, and the like), and the like.

As the aromatic compound, bisarene compounds (bisphenol compounds, hydroxybiphenyl compounds), bisarene compounds having an amino group (bisarylalkane compounds having an amino group, bisarylsulfone compounds having an amino group, biphenyl compounds having an amino group, and the like), hydroxyarene compounds (hydroxynaphthalene compounds, phenol compounds, and the like), aminoarene compounds (aminonaphthalene compounds, aniline compounds (aminobenzenesulfonic acid, alkylaminobenzenesulfonic acid, and the like), and the like), and the like are preferable. The aromatic compound may further have a substituent. The organic expander may contain one or more or a plurality of residues of these compounds. As the bisphenol compound, bisphenol A, bisphenol S, bisphenol F, and the like are preferable.

The condensate preferably contains a unit of an aromatic compound having at least a sulfur-containing group. In particular, when a condensate containing at least a unit of a bisphenol compound having a sulfur-containing group is used, an effect of suppressing deterioration of low temperature HR discharge performance after high temperature light load test can be enhanced. From the viewpoint of enhancing the effect of suppressing liquid decrease, it is preferable to use a condensate of a naphthalene compound having a sulfur-containing group and having a hydroxy group and/or an amino group with an aldehyde compound.

The sulfur-containing group may be directly bonded to the aromatic ring contained in the compound, and for example, may be bonded to the aromatic ring as an alkyl chain having a sulfur-containing group. The sulfur-containing group is not particularly limited, and examples thereof include a sulfonyl group, a sulfonic acid group or a salt thereof, and the like.

In addition, as the organic expander, for example, at least a condensate containing at least one selected from the group consisting of units of the bisarene compound and units of a monocyclic aromatic compound (hydroxyarene compound and/or aminoarene compound, or the like) may be used. The organic expander may contain at least a condensate containing a unit of a bisarene compound and a unit of a monocyclic aromatic compound (among them, hydroxyarene compound). Examples of such a condensate include a condensate of a bisarene compound and a monocyclic aromatic compound with an aldehyde compound. As the hydroxyarene compound, a phenol sulfonic acid compound (phenol sulfonic acid, a substituted product thereof, or the like) is preferable. As the aminoarene compound, aminobenzenesulfonic acid, alkylaminobenzenesulfonic acid, and the like are preferable. As the monocyclic aromatic compound, a hydroxyarene compound is preferable.

The content of the organic expander contained in the negative electrode material is, for example, 0.01% by mass or more and may be 0.05% by mass or more. The content of the organic expander is, for example, 1.0% by mass or less and may be 0.5% by mass or less. These lower limit values and upper limit values can be combined arbitrarily.

The content of the organic expander contained in the negative electrode material may be 0.01 to 1.0% by mass, 0.05 to 1.0% by mass, 0.01 to 0.5% by mass, or 0.05 to 0.5% by mass.

(Carbonaceous Material)

As the carbonaceous material contained in the negative electrode material, carbon black, graphite, hard carbon, soft carbon, and the like can be used. Examples of the carbon black include acetylene black, Ketjen black, furnace black, lamp black, and the like. The graphite may be a carbonaceous material including a graphite-type crystal structure and may be either artificial graphite or natural graphite. One kind of carbonaceous material may be used alone, or two or more kinds thereof may be used in combination.

The content of the carbonaceous material in the negative electrode material is, for example, 0.05% by mass or more and may be 0.10% by mass or more. The content of the carbonaceous material is, for example, 5% by mass or less and may be 3% by mass or less. These lower limit values and upper limit values can be combined arbitrarily.

The content of the carbonaceous material in the negative electrode material may be 0.05 to 5% by mass, 0.05 to 3% by mass, 0.10 to 5% by mass, or 0.10 to 3% by mass.

(Barium Sulfate)

The content of barium sulfate in the negative electrode material is, for example, 0.05% by mass or more and may be 0.10% by mass or more. The content of barium sulfate in the negative electrode material is 3% by mass or less and may be 2% by mass or less. These lower limit values and upper limit values can be combined arbitrarily.

The content of barium sulfate in the negative electrode material may be 0.05 to 3% by mass, 0.05 to 2% by mass, 0.10 to 3% by mass, or 0.10 to 2% by mass.

(1) Analysis of Polymer Compound

Prior to analysis, a lead-acid battery after formation is fully charged and then disassembled to obtain a negative electrode plate to be analyzed. The obtained negative electrode plate is washed with water to remove sulfuric acid from the negative electrode plate. The washing with water is performed until it is confirmed that color of a pH test paper does not change by pressing the pH test paper against the surface of the negative electrode plate washed with water. However, the washing with water is performed within two hours. The negative electrode plate washed with water is dried at 60±5° C. in a reduced pressure environment for about six hours. When an attached member is included after drying, the attached member is removed from the negative electrode plate by peeling. Next, the negative electrode material is separated from the negative electrode plate to obtain a sample (hereinafter also referred to as sample A.). Sample A is ground as necessary and subjected to analysis.

(1-1) Qualitative Analysis of Polymer Compound 150.0±0.1 mL of chloroform is added to 100.0±0.1 g of the pulverized sample A, and the mixture is stirred at 20±5° C. for 16 hours to extract a polymer compound. Thereafter, the solid content is removed by filtration. For a chloroform solution in which the polymer compound obtained by the extraction is dissolved or a polymer compound obtained by drying the chloroform solution, information is obtained from an infrared spectroscopic spectrum, an ultraviolet-visible absorption spectrum, an NMR spectrum, LC-MS and/or pyrolysis GC-MS, and the like to specify the polymer compound.

Chloroform is distilled off under reduced pressure from the chloroform solution in which the polymer compound obtained by the extraction is dissolved to recover a chloroform soluble component. The chloroform soluble component is dissolved in deuterated chloroform, and a $^1$H-NMR spectrum is measured under the following conditions. From this $^1$H-NMR spectrum, a peak with a chemical shift in the range of 3.2 ppm or more and 3.8 ppm or less is confirmed. Also, from the peak in this range, the type of the oxy $C_{2-4}$ alkylene unit is specified.

Apparatus: type AL400 nuclear magnetic resonance spectrometer, manufactured by JEOL Ltd.
Observation frequency: 395.88 MHz
Pulse width: 6.30 µs
Pulse repeating time: 74.1411 seconds
Number of integrations: 32
Measurement temperature: room temperature (20 to 35° C.)
Reference: 7.24 ppm
Sample tube diameter: 5 mm From the $^1$H-NMR spectrum, an integrated value (V1) of the peak at which the chemical shift is present in the range of 3.2 ppm or more and 3.8 ppm or less is determined. In addition, for each of the hydrogen atoms of the —$CH_2$— group and the —CH< group bonded to the oxygen atom bonded to the terminal group of the polymer compound, the sum ($V_2$) of integrated values of peaks in the $^1$H-NMR spectrum is determined. Then, from $V_1$ and $V_2$, a ratio of $V_1$ to the sum of $V_1$ and $V_2$ ($=V_1/(V_1+V_2)\times100(\%)$) is determined.

When the integrated value of the peak in the $^1$H-NMR spectrum is determined in the qualitative analysis, two points having no significant signal are determined so as to sandwich the corresponding peak in the ill-NMR spectrum, and each integrated value is calculated using a straight line connecting the two points as a baseline. For example, for the peak in which the chemical shift is present in a range of 3.2 ppm to 3.8 ppm, a straight line connecting two points of 3.2 ppm and 3.8 ppm in the spectrum is used as a baseline. For example, for a peak in which the chemical shift is present in a range of more than 3.8 ppm and 4.0 ppm or less, a straight line connecting two points of 3.8 ppm and 4.0 ppm in the spectrum is used as a baseline.

(1-2) Quantitative Analysis of Polymer Compound

An appropriate amount of the chloroform soluble component is dissolved in deuterated chloroform together with tetrachloroethane (TCE) of $m_r$ (g) measured with an accuracy of ±0.0001 g, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and mass-based content $C_n$ (ppm) of the polymer compound in the negative electrode material is determined from the following formula.

$$C_n=S_a/S_r\times N_r/N_a\times M_a/M_r\times m_r/m\times 1,000,000$$

(wherein $M_a$ is a molecular weight of a structure showing a peak in a chemical shift range of 3.2 to 3.8 ppm (more specifically, a molecular weight of the repeating structure of oxy $C_{2-4}$ alkylene units), and $N_a$ is the number of hydrogen atoms bonded to a carbon atom of a main chain of the repeating structure. $N_r$ and $M_r$ are the number of hydrogen contained in a molecule of reference substance and the molecular weight of the reference substance, respectively, and m (g) is the mass of the negative electrode material used for extraction.)

Since the reference substance in this analysis is TCE, $N_r=2$ and $M_r=168$. In addition, m=100.

For example, when the polymer compound is polypropylene glycol, $M_a$ is 58, and $N_a$ is 3. When the polymer compound is polyethylene glycol, $M_a$ is 44, and $N_a$ is 4. In the case of a copolymer, $N_a$ is a value obtained by averaging $N_a$ values of each monomer unit using a molar ratio (mol %) of each monomer unit contained in the repeating structure, and $M_a$ is determined according to the type of each monomer unit.

In the quantitative analysis, the integrated value of the peak in the $^1$H-NMR spectrum is determined using data processing software "ALICE" manufactured by JEOL Ltd.

(1-3) Mn Measurement of Polymer Compound

GPC Measurement of the polymer compound is performed using the following apparatus under the following conditions. Separately, a calibration curve (standard curve) is prepared from a plot of Mn of the standard substance and elution time. The Mn of the polymer compound is calculated based on the standard curve and the GPC measurement result of the polymer compound.

Analysis system: 20A system (manufactured by Shimadzu Corporation)
Column: two columns of GPC KF-805L (manufactured by Shodex) connected in series
Column temperature: 30° C.
Mobile phase: tetrahydrofuran
Flow rate: 1 mL/min.
Concentration: 0.20% by mass
Injection amount: 10 µL
Standard substance: polyethylene glycol (Mn=2,000,000, 200,000, 20,000, 2,000, 200)
Detector: differential refractive index detector (Shodex RI-20111, manufactured by Shodex)

(Positive Electrode Plate)

The positive electrode plate of a lead-acid battery can be classified into a paste type, a clad type, and the like. The paste-type positive electrode plate includes a positive current collector and a positive electrode material. The positive electrode material is held by the positive current collector. In the paste-type positive electrode plate, the positive electrode material is obtained by removing the positive current collector from the positive electrode plate. The clad-type positive electrode plate includes a plurality of porous tubes, a spine inserted into each tube, a current collector coupling the plurality of spines, a positive electrode material with which a spine inserted tube is filled, and a joint that couples the plurality of tubes. In the clad-type positive electrode plate, the positive electrode material is a material obtained by removing the tube, the spine, the current collector, and the joint. In the clad-type positive electrode plate, the spine and the current collector may be collectively referred to as a positive current collector.

The positive electrode material is held by the positive current collector. The positive electrode material contains a positive active material (lead dioxide or lead sulfate) that exhibits a capacity through a redox reaction. The positive electrode material may optionally contain another additive. The positive electrode material is obtained by removing the positive current collector from the positive electrode plate.

The positive current collector may be formed by casting lead alloy containing Sn, or may be formed by processing a lead alloy sheet containing Sn. Examples of the processing method include expanding processing and punching processing. It is preferable to use a grid-like current collector as the positive current collector because the positive electrode material is easily supported.

The lead alloy used for the positive current collector may be a Pb—Sn-based alloy, a Pb—Ca—Sn-based alloy, or the like. The lead alloy may further contain, as an additive element, at least one selected from the group consisting of Ba, Ag, Al, Bi, As, Se, Cu, and the like.

Sn is expensive, and as the Sn content increases, the elongation amount of lead alloy decreases; therefore, the upper limit of the Sn content of the positive current collector is, for example, less than 3.0% by mass, preferably 2.5% by mass or less, and from the viewpoint of securing higher workability, the Sn content is preferably 1.8% by mass or less. From the viewpoint of more remarkably suppressing corrosion of the positive current collector during float charging in a high-temperature environment, the Sn content of the positive current collector is preferably 0.95% by mass or more and 1.1% by mass or more. That is, the Sn content of the positive current collector is, for example, 0.95% by mass or more and less than 3.0% by mass, may be 1.1% by mass or more and less than 3.0% by mass, may be 0.95% by mass or more and 2.5% by mass or less, may be 1.1% by mass or more and 2.5% by mass or less, may be 0.95% by mass or more and 1.8% by mass or less, or may be 1.1% by mass or more and 1.8% by mass or less.

When the positive current collector contains Ca, the workability of lead alloy is improved, and the productivity of the positive current collector is improved. From the viewpoint of enhancing the effect of suppressing corrosion of the positive current collector, the Ca content of the positive current collector is preferably 0.17% by mass or less, more preferably 0.13 parts by mass or less, and may be 0.10 parts by mass or less, 0.07% by mass or less, or 0.05% by mass or less. From the viewpoint of sufficiently obtaining the effect of improving the productivity of the positive current collector by addition of Ca, the Ca content of the positive current collector may be, for example, 0.01% by mass or more, and may be 0.03% by mass or more. That is, the Ca content of the positive current collector is, for example, 0.01% by mass or more and 0.17% by mass or less, 0.01% by mass or more and 0.13% by mass or less, 0.01% by mass or more and 0.10% by mass or less, 0.01% by mass or more and 0.07% by mass or less, 0.01% by mass or more and 0.05% by mass or less, 0.03% by mass or more and 0.17% by mass or less, 0.03% by mass or more and 0.13% by mass or less, 0.03% by mass or more and 0.10% by mass or less, 0.03% by mass or more and 0.07% by mass or less, or 0.03% by mass or more and 0.05% by mass or less.

In particular, in a maintenance-free lead-acid battery which does not require water addition, it is effective to use a Pb—Ca—Sn alloy as the positive current collector. The positive current collector may include a surface layer. The surface layer and the inner layer of the positive current collector may have different compositions. The surface layer may be formed in a part of the positive current collector. The surface layer may be formed only on the grid portion, only on the lug portion, or only on the frame rib portion of the positive current collector.

A member such as a mat or a pasting paper may be stuck to the positive electrode plate. Such a member (sticking member) is used integrally with the positive electrode plate and is thus assumed to be included in the positive electrode plate. Also, when the positive electrode plate includes such a member, the positive electrode material is obtained by removing the positive current collector and the sticking member from the positive electrode plate in the paste-type positive electrode plate.

A non-formed paste-type positive electrode plate is obtained by filling a positive current collector with a positive electrode paste, and curing and drying the paste. The positive electrode paste is prepared by kneading lead powder, an additive, water, and sulfuric acid. A non-formed clad-type positive electrode plate is formed by filling a porous tube, into which a spine connected by a current collector is inserted with lead powder or a slurry-like lead powder, and joining a plurality of tubes with a joint. Thereafter, the positive electrode plate is obtained by forming the non-formed positive electrode plates.

The positive electrode plate can be formed, for example, in such a manner that a positive current collector is coated or filled with a positive electrode paste, which is then cured and dried to prepare a non-formed negative electrode plate, and thereafter, the non-formed positive electrode plate is formed. The positive electrode paste is prepared by adding an additive to lead powder as necessary, further adding water and sulfuric acid, and kneading the mixture. At the time of curing, it is preferable to cure the non-formed positive electrode plate at a higher temperature than room temperature and high humidity.

Quantification of Sn and Ca contained in the positive current collector can be analyzed, for example, in accordance with lead separation inductively coupled plasma atomic emission spectroscopy described in JIS H 2105. When analyzing the content of elements contained in the positive current collector of the positive electrode plate taken out from the lead-acid battery, first, vibration is applied to the positive electrode plate to cause the positive electrode material to fall off from the positive current collector, then the positive electrode material remaining around the positive current collector is removed using a ceramic knife, and a part of the positive current collector having metallic luster is collected as a sample. The collected sample is decomposed with tartaric acid and dilute nitric acid to obtain an aqueous solution. Hydrochloric acid is added to the aqueous solution to precipitate lead chloride, and the filtrate was collected by filtration. Sn and Ca concentrations in the filtrate are analyzed by a calibration curve method using an ICP emission spectrophotometer (for example, ICPS-8000 manufactured by Shimadzu Corporation), and converted to the Sn content and the Ca content per mass of the positive current collector.

(Formation)

Formation of the negative electrode plate and the positive electrode plate can be performed, for example, by charging an element in a state where the element including the non-formed negative electrode plate and the non-formed positive electrode plate is immersed in an electrolyte solution containing sulfuric acid in a container of the lead-acid battery. However, the formation may be performed before the lead-acid battery or the element is assembled. Spongy lead is generated in the negative electrode plate and lead dioxide is generated in the positive electrode plate by formation.

(Separator)

The separator may have a sheet shape or may be formed in a bag shape. One sheet-like separator may be disposed between the positive electrode plate and the negative electrode plate. Further, the electrode plate may be disposed so as to be sandwiched by one sheet-like separator in a folded state. In this case, the positive electrode plate sandwiched by the folded sheet-like separator and the negative electrode plate sandwiched by the folded sheet-like separator may be overlapped, or one of the positive electrode plate and the negative electrode plate may be sandwiched by the folded sheet-like separator and overlapped with the other electrode plate. Also, the sheet-like separator may be folded into a bellows shape, and the positive electrode plate and the negative electrode plate may be sandwiched by the bellows-shaped separator such that the separator is interposed therebetween. When the separator folded in a bellows shape is used, the separator may be disposed such that the folded portion is along the horizontal direction of the lead-acid battery (e.g., such that the bent portion may be parallel to the horizontal direction), and the separator may be disposed such that the folded portion is along the vertical direction (e.g., such that the bent portion is parallel to the vertical direction). In the separator folded in the bellows shape, recesses are alternately formed on both main surface sides of the separator. Since the lugs are usually formed on the upper portion of the positive electrode plate and the negative electrode plate, when the separator is disposed such that the folded portions are along the horizontal direction of the lead-acid battery, the positive electrode plate and the negative electrode plate are each disposed only in the recess on one main surface side of the separator (i.e., a double separator is interposed between the adjacent positive and negative plates). When the separator is disposed such that the folded portion is along the vertical direction of the lead-acid battery, the positive electrode plate can be housed in the recess on one main surface side, and the negative electrode plate can be housed in the recess on the other main surface side (i.e., the separator can be interposed singly between the adjacent positive and negative plates). When the bag-shaped separator is used, the bag-shaped separator may house the positive electrode plate or may house the negative electrode plate.

In the present specification, the up-down direction of the plate means the up-down direction of the lead-acid battery in the vertical direction.

(Electrolyte Solution)

The electrolyte solution is an aqueous solution containing sulfuric acid and may be gelled as necessary. The polymer compound may be contained in the electrolyte solution.

The concentration of the polymer compound in the electrolyte solution may be, for example, 500 ppm or less, 300 ppm or less, or 200 ppm or less on a mass basis. When the electrolyte solution contains a small amount of the polymer compound as described above, the polymer compound is easily adhered to the Sn compound precipitated at the crystal grain boundary of the positive current collector. The concentration of the polymer compound in the electrolyte solution may be 1 ppm or more or 5 ppm or more on a mass basis. These upper limit values and lower limit values can be combined arbitrarily.

The concentration of the polymer compound in the electrolyte solution may be, for example, more than 8 ppm and 500 ppm or less, 15 ppm or more and 300 ppm or less, or 15 ppm or more and 200 ppm or less on a mass basis. As described above, even when the amount of the polymer compound contained in the negative electrode material and the electrolyte solution is small, by controlling the Sn content of the positive current collector to 0.95% by mass or more, the amount of charge during float charging is reduced, and the effect of suppressing corrosion of the positive current collector is obtained.

The polymer compound preferably contains a compound having at least Mn of 500 or more. In this case, the polymer compound tends to remain in the negative electrode material, and in addition, the adsorbability to lead is enhanced; therefore, the effect of reducing the amount of charge during float charging is further enhanced.

It is also preferable that the concentration of the polymer compound in the electrolyte solution is 100 ppm or more. At this time, the polymer compound preferably contains at least a compound having Mn of 1,000 or more and 5,000 or less. Since the polymer compound having Mn of 5,000 or less is easily dissolved in the electrolyte solution and easily moves in the electrolyte solution, the polymer compound moves into the positive electrode plate (positive current collector) and negative electrode material and can further enhance the effect of reducing the amount of charge during float charging. In the polymer compound having Mn of 1,000 or more, it is considered that the adsorbability to lead is further enhanced, and the effect of reducing the amount of charge during float charging can be further enhanced. When the lead-acid battery is used for a long period of time, the structural change of the negative electrode material gradually proceeds, and the polymer compound tends to be easily eluted from the negative electrode plate. However, when the electrolyte solution contains some concentration of polymer compound, elution of the polymer compound from the negative electrode plate can be suppressed, the polymer compound can be retained in the negative electrode material, and the polymer compound can be replenished from the electrolyte solution to the negative electrode plate.

Regarding the concentration of the polymer compound in the electrolyte solution, chloroform is added to and mixed with a predetermined amount (m1 (g)) of the electrolyte solution taken out from the formed lead-acid battery in a fully charged state, the mixture is allowed to stand to be separated into two layers, and then only the chloroform layer is taken out. After repeating this operation several times, chloroform is distilled off under reduced pressure to obtain a chloroform soluble content. An appropriate amount of the chloroform soluble component is dissolved in deuterated chloroform together with 0.0212±0.0001 g of TCE, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and content $C_e$ of the polymer compound in the electrolyte solution is determined from the following formula.

$$C_e = S_a/S_r \times N_r/N_a \times M_a/M_r \times m_r/m_1 \times 1,000,000$$

wherein $M_a$ and $N_a$ are the same as described above.

The electrolyte solution may contain cations (e.g., metal cations such as sodium ion, lithium ion, magnesium ion, and/or aluminum ion) and/or anions (e.g., anions other than sulfate anions such as phosphate ions) as necessary.

The specific gravity of the electrolyte solution in the lead-acid battery in the fully charged state at 20° C. is, for example, 1.20 or more and may be 1.25 or more. The specific gravity of the electrolyte solution at 20° C. is 1.35 or less and preferably 1.32 or less. These lower limit values and upper limit values can be combined arbitrarily. The specific gravity of the electrolyte solution at 20° C. may be 1.20 or more and 1.35 or less, 1.20 or more and 1.32 or less, 1.25 or more and 1.35 or less, or 1.25 or more and 1.32 or less.

The storage battery can be obtained by a production method including a step of assembling a lead-acid battery by housing a positive electrode plate, a negative electrode plate, and an electrolyte solution in a container. In the assembly process of the lead-acid battery, the separator is usually disposed so as to be interposed between the positive electrode plate and the negative electrode plate. The assembly process of the lead-acid battery may include a step of forming the positive electrode plate and/or the negative electrode plate as necessary after the step of housing the positive electrode plate, the negative electrode plate, and the electrolyte solution in the container. The positive electrode plate, the negative electrode plate, the electrolyte solution, and the separator are each prepared before being housed in the container.

FIG. 1 shows an appearance of an example of a lead-acid battery according to an embodiment of the present invention. An automotive battery 1 includes a container 12 that houses an element 11 and an electrolyte solution (not shown). The inside of the container 12 is partitioned by partitions 13 into a plurality of cell chambers 14. Each cell chamber 14 contains one element 11. An opening of the container 12 is closed with a lid 15 having a negative electrode terminal 16 and a positive electrode terminal 17. The lid 15 is provided with a vent plug 18 for each cell chamber. At the time of water addition, the vent plug 18 is removed to supply a water addition liquid. The vent plug 18 may have a function of discharging gas generated in the cell chamber 14 to the outside of the battery.

The element 11 is configured by laminating a plurality of negative electrode plates 2 and positive electrode plates 3 with a separator 4 interposed therebetween. Here, the bag-shaped separator 4 housing the negative electrode plate 2 is shown, but the form of the separator is not particularly limited. In the cell chamber 14 located at one end of the container 12, a negative electrode shelf portion 6 for connecting the plurality of negative electrode plates 2 in parallel is connected to a penetrating connection body 8, and a positive electrode shelf portion 5 for connecting the plurality of positive electrode plates 3 in parallel is connected to a positive pole 7. The positive pole 7 is connected to the positive electrode terminal 17 outside the lid 15. In the cell chamber 14 located at the other end of the container 12, a negative pole 9 is connected to the negative electrode shelf portion 6, and the penetrating connection body 8 is connected to the positive electrode shelf portion 5. The negative pole 9 is connected to the negative electrode terminal 16 outside the lid 15. Each of the penetrating connection bodies 8 passes through a through-hole provided in the partition 13 to connect the elements 11 of the adjacent cell chambers 14 in series.

The positive electrode shelf portion 5 is formed by welding the lugs, provided on the upper portions of the respective positive electrode plates 3, to each other by a cast-on-strap method or a burning method. The negative electrode shelf portion 6 is also formed by welding the lugs, provided on the upper portions of the respective negative electrode plates 2, to each other in accordance with the case of the positive electrode shelf portion 5.

The lid 15 of the lead-acid battery has a single structure (single lid), but is not limited to the illustrated examples. The lid 15 may have, for example, a double structure including an inner lid and an outer lid (or an upper lid). The lid having the double structure may have a reflux structure between the inner lid and the outer lid for returning the electrolyte solution into the battery (inside the inner lid) through a reflux port provided in the inner lid.

<High Temperature Float Durability>

Two same lead-acid batteries to be measured are prepared. One lead-acid battery is immersed in a water tank at 75° C.±3° C., and subjected to constant voltage charge (that is, high-temperature float charging) at 2.5 V/cell for 30 days. Thereafter, the lead-acid battery is disassembled, the positive current collector is taken out from the positive electrode plate, and a corrosive layer is removed with an aqueous solution in which mannitol, hydrazine, and sodium hydroxide are dissolved. A mass W1 of the positive current collector after removal of the corrosive layer is measured. The other lead-acid battery is disassembled without being subjected to high-temperature float charging, the positive current collector is taken out from the positive electrode plate, and the mass W0 of the positive current collector having no corrosive layer is measured. A difference between W0 and W1 was calculated as a corrosion amount, and an inverse thereof was indexed as the high-temperature float durability. The larger the corrosion amount, the smaller the inverse (index). The larger the index value, the better the durability.

The lead-acid battery according to one aspect of the present invention will be described below.

(1) A lead-acid battery including a positive electrode plate, a negative electrode plate, an electrolyte solution, and a polymer compound,
in which the positive electrode plate includes a positive current collector and a positive electrode material,
the negative electrode plate includes a negative current collector and a negative electrode material,
the positive current collector contains Sn in an amount of 0.95% by mass or more, and
the polymer compound has a peak in a range of 3.2 ppm or more and 3.8 ppm or less in a chemical shift of $^1$H-NMR spectrum.

(2) In (1) above, the content of Sn in the positive current collector may be, for example, less than 3% by mass.

(3) In (1) above, the positive current collector may further contain Ca.

(4) In any one of (1) to (3) above, at least the negative electrode material preferably contains the polymer compound.

(5) In (4) above, the content of the polymer compound in the negative electrode material may be, for example, 5 to 500 ppm in mass ratio.

(6) In any one of (1) to (5) above, a number average molecular weight of the polymer compound may be, for example, 500 or more.

(7) A lead-acid battery including a positive electrode plate, a negative electrode plate, an electrolyte solution, and a polymer compound,
in which the positive electrode plate includes a positive current collector and a positive electrode material,
the negative electrode plate includes a negative current collector and a negative electrode material,
the positive current collector contains Sn in an amount of 0.95% by mass or more, and
the polymer compound contains a repeating structure of oxy $C_{2-4}$ alkylene units.

(8) In (7) above, the content of Sn in the positive current collector may be, for example, less than 3% by mass.

(9) In (7) above, the positive current collector may further contain Ca.

(10) In (7) above, at least the negative electrode material preferably contains the polymer compound.

(11) In (7) above, the content of the polymer compound in the negative electrode material may be, for example, 5 to 500 ppm in mass ratio.

(12) In any one of (7) to (11) above, a number average molecular weight of the polymer compound may be, for example, 500 or more.

Hereinafter, the present invention will be specifically described on the basis of examples and comparative examples, but the present invention is not limited to the following examples.

<<Lead-Acid Batteries A1 to A15 and R1 to R13>>

(1) Preparation of Lead-Acid Battery

Using a negative electrode material having a polypropylene glycol (PPG) content and a positive current collector having a Sn content shown in the following Table 1, lead-acid batteries A1 to A15 and R1 to R13 were assembled in the manner of the following (a) to (c). A1 to A15 correspond to Examples, and R1 to R13 correspond to Comparative Examples.

TABLE 1

| Positive current collector | Negative electrode material PPG content (ppm) | | | |
|---|---|---|---|---|
| | 0 | 5 | 50 | 250 |
| Sn content (mass %) 0.40 | R1 | R8 | R10 | R12 |
| 0.60 | R2 | R9 | R11 | R13 |
| 0.95 | R3 | A1 | A6 | A11 |
| 1.10 | R4 | A2 | A7 | A12 |
| 1.40 | R5 | A3 | A8 | A13 |
| 1.80 | R6 | A4 | A9 | A14 |
| 2.50 | R7 | A5 | A10 | A15 |

(a) Preparation of Negative Electrode Plate

Lead powder as raw material, barium sulfate, carbon black, a polymer compound (polypropylene glycol (PPG), Mn=1,500), and an organic expander (condensate of bisphenol compound having sulfonic acid group introduced and formaldehyde) are mixed with an appropriate amount of a sulfuric acid aqueous solution to obtain a negative electrode paste. At this time, the components are mixed so that the content of the polymer compound in the negative electrode material, which is determined by the procedure described above, is the value shown in Table 1, the content of barium sulfate is 0.6% by mass, the content of carbon black is 0.3% by mass, and the content of the organic expander is 0.1% by mass. A mesh portion of an expanded grid made of a Pb—Ca—Sn alloy which is a negative current collector is filled with the negative electrode paste, which is then cured and dried to obtain a non-formed negative electrode plate.

(b) Preparation of Positive Electrode Plate

Lead powder as raw material is mixed with a sulfuric acid aqueous solution to obtain a positive electrode paste. A mesh portion of an expanded grid made of a Pb—Ca—Sn alloy is filled with the positive electrode paste, which is then cured and dried to obtain a non-formed positive electrode plate. The Sn content of the positive current collector (that is, Pb—Ca—Sn alloy herein) determined by the procedure described above is the value shown in Table 1. The Ca content of Pb—Ca—Sn alloy is 0.09% by mass.

(c) Preparation of Test Battery

A test battery has a rated voltage of 2 V and a rated 5-hour rate capacity of 32 Ah. An element of the test battery includes seven positive electrode plates and seven negative electrode plates. The negative electrode plate is housed in a bag-shaped separator and stacked with the positive electrode plate to form the element. The element is housed in a polypropylene container together with an electrolyte solution (sulfuric acid aqueous solution), and subjected to formation in the container to prepare a flooded-type lead-acid battery. The specific gravity of the electrolyte solution after formation is 1.28 (in terms of 20° C.).

In the $^1$H-NMR spectrum of the polymer compound measured by the procedure described above, a peak derived from —$CH_2$— of the oxypropylene unit is observed in a chemical shift range of 3.2 ppm or more and 3.42 ppm or less, and a peak derived from CH< and —$CH_2$— of the oxypropylene unit is observed in a chemical shift range of more than 3.42 ppm and 3.8 ppm or less. In addition, in the $^1$H-NMR spectrum, a ratio of an integrated value of the peak of 3.2 ppm to 3.8 ppm to the sum of the integrated value of this peak, an integrated value of a peak of hydrogen atoms of the —$CH_2$— group bonded to the oxygen atom, and an integrated value of a peak of a hydrogen atom of the —CH< group bonded to the oxygen atom is 98.1%.

(2) Evaluation

Using the lead-acid battery, a high-temperature float durability was measured by the method described above. Tables 2A to 2D show the results.

TABLE 2A

| No. | Negative electrode material PPG content (ppm) | Positive current collector Sn content (%) | High temperature float durability |
|---|---|---|---|
| R1 | 0 | 0.40% | 96 |
| R2 | 0 | 0.60% | 100 |
| R3 | 0 | 0.95% | 121 |
| R4 | 0 | 1.10% | 128 |
| R5 | 0 | 1.40% | 138 |
| R6 | 0 | 1.80% | 160 |
| R7 | 0 | 2.50% | 168 |

TABLE 2B

| No. | Negative electrode material PPG content (ppm) | Positive current collector Sn content (%) | High temperature float durability |
|---|---|---|---|
| R8 | 5 | 0.40% | 87 |
| R9 | 5 | 0.60% | 101 |
| A1 | 5 | 0.95% | 129 |
| A2 | 5 | 1.10% | 148 |
| A3 | 5 | 1.40% | 163 |
| A4 | 5 | 1.80% | 170 |
| A5 | 5 | 2.50% | 175 |

TABLE 2C

| No. | Negative electrode material PPG content (ppm) | Positive current collector Sn content (%) | High temperature float durability |
|---|---|---|---|
| R10 | 50 | 0.40% | 89 |
| R11 | 50 | 0.60% | 104 |
| A6 | 50 | 0.95% | 137 |
| A7 | 50 | 1.10% | 168 |

TABLE 2C-continued

| No. | Negative electrode material PPG content (ppm) | Positive current collector Sn content (%) | High temperature float durability |
|---|---|---|---|
| A8 | 50 | 1.40% | 173 |
| A9 | 50 | 1.80% | 179 |
| A10 | 50 | 2.50% | 185 |

TABLE 2D

| No. | Negative electrode material PPG content (ppm) | Positive current collector Sn content (%) | High temperature float durability |
|---|---|---|---|
| R12 | 250 | 0.40% | 90 |
| R13 | 250 | 0.60% | 105 |
| A11 | 250 | 0.95% | 142 |
| A12 | 250 | 1.10% | 173 |
| A13 | 250 | 1.40% | 184 |
| A14 | 250 | 1.80% | 196 |
| A15 | 250 | 2.50% | 201 |

Figure 2:
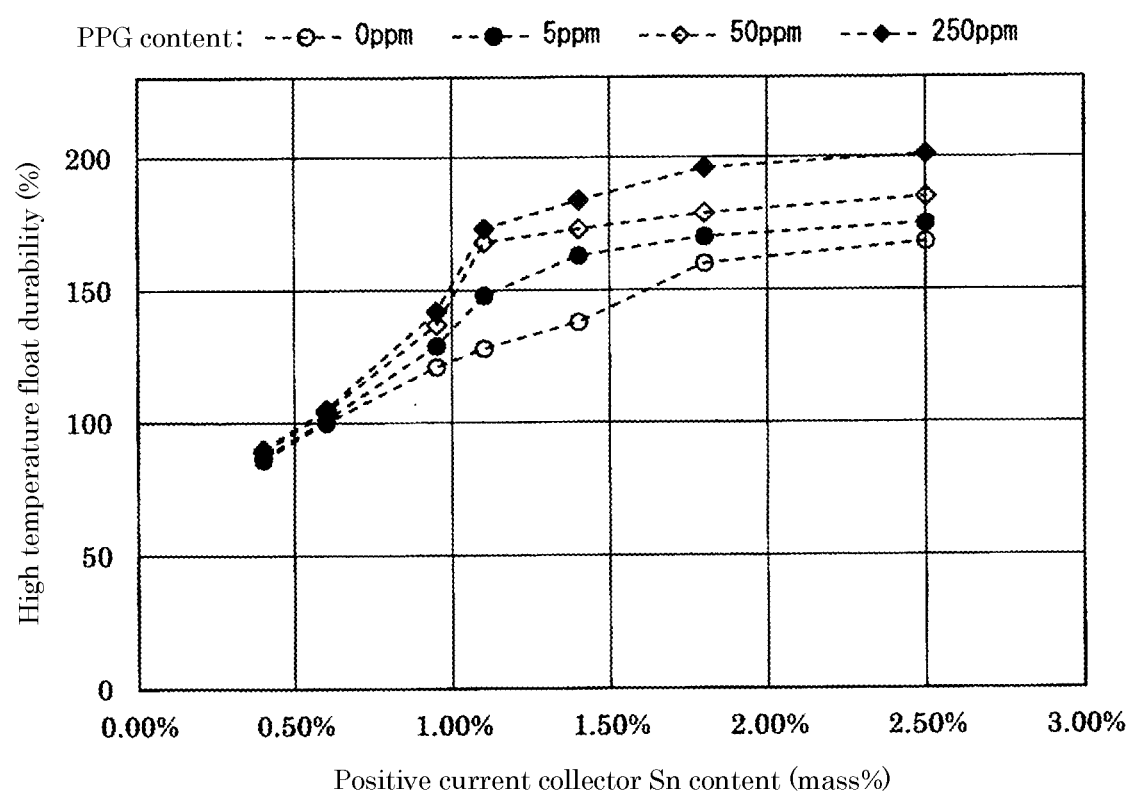
FIG. 2 is a graph showing a relationship between an Sn content of a positive current collector and high-temperature float durability.

FIG. 2 shows a relationship between the Sn content of the positive current collector and high-temperature float durability in a graphic form. From Tables 2A to 2D and FIG. 2, it can be understood that when the Sn content of the positive current collector is 0.95% by mass or more, the improvement of the high-temperature float durability due to the inclusion of the polymer compound in the negative electrode material becomes remarkable. In particular, when the Sn content of the positive current collector is in a range of 1.10% by mass to 1.80% by mass, the durability is remarkably improved regardless of the content of the polymer compound (PPG) in the negative electrode material.

<<Batteries A16, A17, R14, and R15>>

Lead-acid batteries A16 and A17 of Examples and lead-acid batteries R14 and R15 of Comparative Examples were prepared and evaluated similarly as described above except that the Sn content of the positive current collector was 1.10% by mass or 0.60% by mass and the PPG content in the negative electrode material was 500 ppm or 750 ppm.

Table 3 shows the results together with excerpts from Tables 2A to 2D when the Sn content is 1.10% by mass or 0.60% by mass. From Table 3, it can be easily understood that a behavior of the durability by adding PPG to the negative electrode material greatly differs between a case where the Sn content of the positive current collector is more than 0.95% by mass and a case where the Sn content of the positive current collector is less than 0.95% by mass.

TABLE 3

| No. | Negative electrode material PPG content (ppm) | Positive current collector Sn content (%) | High temperature float durability |
|---|---|---|---|
| R4 | 0 | 1.10 | 128 |
| A2 | 5 | 1.10 | 148 |
| A1 | 50 | 1.10 | 168 |
| A12 | 250 | 1.10 | 173 |
| A16 | 500 | 1.10 | 183 |
| A17 | 750 | 1.10 | 172 |
| R2 | 0 | 0.60 | 100 |

TABLE 3-continued

| No. | Negative electrode material PPG content (ppm) | Positive current collector Sn content (%) | High temperature float durability |
|---|---|---|---|
| R9 | 5 | 0.60 | 101 |
| R11 | 50 | 0.60 | 104 |
| R13 | 250 | 0.60 | 105 |
| R14 | 500 | 0.60 | 112 |
| R15 | 750 | 0.60 | 101 |

<<Batteries A18 to A21>>

Lead-acid batteries A18 to A21 of Examples were prepared and evaluated similarly to the battery A12 of Example except that the number average molecular weight of the polymer compound contained in the negative electrode material was changed as shown in Table 4. Table 4 shows the results.

TABLE 4

| No. | Negative electrode material PPG content (ppm) | PPG molecular weight (Mn) | Positive current collector Sn content (%) | High temperature float durability |
|---|---|---|---|---|
| A18 | 250 | 500 | 1.10 | 145 |
| A19 | 250 | 1000 | 1.10 | 168 |
| A12 | 250 | 1500 | 1.10 | 173 |
| A20 | 250 | 2500 | 1.10 | 183 |
| A21 | 250 | 3500 | 1.10 | 180 |

According to Table 4, the number average molecular weight Mn of the polymer compound may be 500 or more, and is preferably 1,000 or more from the viewpoint of improving the high-temperature float durability, and it is found that the durability is also improved as the Mn increases to 2,500 or more (for example, about 3,000). However, when Mn exceeds 2,500, improvement in durability is saturated. This is presumed to be because when the Mn increases to a certain value or more, the polymer compound is less likely to be eluted from the negative electrode material, and the amount of the polymer compound adhering to the Sn compound precipitated at the crystal grain boundary of the positive current collector decreases.

<<Batteries A22 and A23>>

Lead-acid batteries A22 and A23 of Examples were prepared and evaluated similarly to the battery A12 of Example except that the Ca content of the positive current collector was changed as shown in Table 5. Table 5 shows the results.

TABLE 5

| No. | Negative electrode material PPG content (ppm) | Positive current collector Ca content (%) | Positive current collector Sn content (%) | High temperature float durability |
|---|---|---|---|---|
| A22 | 250 | 0.06 | 1.10 | 180 |
| A12 | 250 | 0.09 | 1.10 | 173 |
| A23 | 250 | 0.12 | 1.10 | 170 |

According to Table 5, from the viewpoint of the high-temperature float durability, although it is suggested that the lower the Ca content of the positive current collector, the more desirable, there is not so large difference. It is considered that the fact that the corrosion reaction of the positive current collector is easily suppressed when the Ca content decreases is related to the improvement of the durability.

INDUSTRIAL APPLICABILITY

The lead-acid battery according to the present invention can be suitably used as, for example, a power source for starting a vehicle (automobiles, motorcycles, etc.) and a power source for an industrial energy storage apparatus or the like such as an electric vehicle (forklift, etc.). Note that these applications are merely illustrative and not limited to these applications.

DESCRIPTION OF REFERENCE SIGNS

1: lead-acid battery
2: negative electrode plate
3: positive electrode plate
4: separator
5: positive electrode shelf portion
6: negative electrode shelf portion
7: positive pole
8: penetrating connection body
9: negative pole
11: element
12: container
13: partition
14: cell chamber
15: lid
16: negative electrode terminal
17: positive electrode terminal
18: vent plug

The invention claimed is:

1. A lead-acid battery comprising a positive electrode plate, a negative electrode plate, an electrolyte solution, and a polymer compound,
   wherein the positive electrode plate comprises a positive current collector and a positive electrode material,
   the negative electrode plate comprises a negative current collector and a negative electrode material, wherein at least the negative electrode material contains the polymer compound,
   the positive current collector contains Sn in an amount of 0.95% by mass or more, and
   the polymer compound has a peak in a range of 3.2 ppm or more and 3.8 ppm or less in a chemical shift of $^1$H-NMR spectrum and the polymer compound contains a repeating structure of oxy $C_{2-4}$ alkylene units.

2. The lead-acid battery according to claim 1, wherein an Sn content of the positive current collector is less than 3% by mass.

3. The lead-acid battery according to claim 1 or 2, wherein the positive current collector further contains Ca.

4. The lead-acid battery according to claim 1,
   a content of the polymer compound in the negative electrode material is 5 to 500 ppm in mass ratio.

5. The lead-acid battery according to claim 1, wherein a number average molecular weight of the polymer compound is 500 or more.

6. A lead-acid battery comprising a positive electrode plate, a negative electrode plate, an electrolyte solution, and a polymer compound,
   wherein the positive electrode plate comprises a positive current collector and a positive electrode material,
   the negative electrode plate comprises a negative current collector and a negative electrode material, wherein at least the negative electrode material contains the polymer compound,
   the positive current collector contains Sn in an amount of 0.95% by mass or more, and
   the polymer compound contains a repeating structure of oxy $C_{2-4}$ alkylene units.

7. The lead-acid battery according to claim 6, wherein an Sn content of the positive current collector is less than 3% by mass.

8. The lead-acid battery according to claim 6 or 7, wherein the positive current collector further contains Ca.

9. The lead-acid battery according to claim 6,
   a content of the polymer compound in the negative electrode material is 5 to 500 ppm in mass ratio.

10. The lead-acid battery according to claim 6, wherein a number average molecular weight of the polymer compound is 500 or more.

* * * * *